(12) United States Patent
Teipen

(10) Patent No.: US 7,594,800 B2
(45) Date of Patent: Sep. 29, 2009

(54) VENTILATION ASSEMBLY FOR WIND TURBINE ROTOR HUB

(75) Inventor: Ewald Teipen, Lingen (DE)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 11/461,116

(22) Filed: Jul. 31, 2006

(65) Prior Publication Data

US 2008/0025847 A1    Jan. 31, 2008

(51) Int. Cl.
  *F03B 1/00* (2006.01)
(52) U.S. Cl. .............................. 416/247 R; 415/121.2; 415/116; 415/4.3; 415/4.5; 416/175; 416/198 R; 416/203
(58) Field of Classification Search .............. 415/121.2, 415/126, 4.3, 4.5, 116, 127; 416/175, 198 R, 416/203, 247 R; 290/44, 55
  See application file for complete search history.

(56) References Cited

U.S. PATENT DOCUMENTS

| | | | |
|---|---|---|---|
| 4,093,402 A | 6/1978 | Van Holten | |
| 4,117,308 A | 9/1978 | Boggs et al. | |
| 5,916,003 A | 6/1999 | Masini et al. | |
| 6,278,197 B1 * | 8/2001 | Appa | 290/55 |
| 7,056,091 B2 | 6/2006 | Powers | |
| 7,077,629 B2 * | 7/2006 | Chen | 416/99 |
| 7,427,814 B2 * | 9/2008 | Bagepalli et al. | 290/55 |
| 2002/0150464 A1 | 10/2002 | deBlanc et al. | |
| 2004/0160141 A1 | 8/2004 | Dube | |

* cited by examiner

*Primary Examiner*—Ninh H Nguyen
(74) *Attorney, Agent, or Firm*—James McGinness, Esq.; Armstrong Teasdale LLP

(57) ABSTRACT

A ventilation assembly for a wind turbine rotor hub is provided, the ventilation assembly comprising a frame fixedly mountable to the rotor hub, the frame including at least one opening, and a cover for said at least one opening, the cover being mounted to said frame to be freely rotatable with respect to said frame, wherein the cover has at least one ventilation opening to allow the ingress and egress of air and has a shielding member for shielding the at least one ventilation opening against ingress of liquid running down the rotor hub.

19 Claims, 9 Drawing Sheets

VENTILATION ASSEMBLY FOR WIND TURBINE ROTOR HUB

BACKGROUND OF THE INVENTION

The present invention relates to a ventilation assembly for a wind turbine rotor hub, a passive ventilator for a wind turbine rotor hub and a ventilation assembly for a wind turbine rotor blade.

Many installations inside the hub of a wind turbine rotor produce heat during operation. In particular, heat sources inside the hub are as diverse as relays installed in switch cabinets, batteries, chargers for batteries, pitch drive motors, pitch gear boxes, and pitch drive controllers, hydraulic units, as well as the main shaft bearing in some designs. However, reliable operation of several components is only guaranteed within a certain temperature range. For example, electronic circuits or batteries may malfunction at excess temperatures. Due to the several heat sources inside the hub, overheating problems of these components may occur, especially during summer.

To solve these overheating problems, ventilation holes are provided in the hub of some wind turbine designs. However, these ventilation holes are relatively small since, otherwise, water may leak into the interior of the hub through the ventilation holes. Of course, this is unfavorable in view of the sensitive electrical and mechanical installations in the hub. Therefore, only a small amount of heat can be exchanged through the small ventilation holes but the cross-sectional area of the ventilation holes cannot be simply enlarged.

BRIEF DESCRIPTION OF THE INVENTION

In view of the above, a ventilation assembly for a wind turbine rotor hub is provided. The ventilation assembly includes a frame fixedly mountable to the rotor hub, the frame including at least one opening, and a cover for said at least one opening, the cover being mounted to said frame to be freely rotatable with respect to said frame, wherein the cover has at least one ventilation opening to allow the ingress and egress of air and has a shielding member for shielding the at least one ventilation opening against ingress of liquid running down the rotor hub.

Further aspects, advantages and features of the present invention are apparent from the dependent claims, the description and the accompanying drawings.

According to a first aspect of the present invention, an air vent for a wind turbine rotor hub is provided. The air vent has a support structure which can be attached to the rotor hub. The support structure includes an inlet opening. Further to this, the air vent includes a protection for the least one opening, wherein the protection is assembled to the support so that it is freely rotatable with respect to the support. The protection has at least one vent hole to allow air being exchanged between the inside and the outside of the rotor hub. Further to this, the protection includes a screen adapted to prevent liquid, especially rainwater or condensed water, running down the rotor hub from entering the interior of the rotor hub.

The air vent according to the first aspect of the present invention can provide a large vent hole for exchanging air between the interior and the exterior of the rotor hub. Thus, overheating problems of installations inside the rotor hub can be considerably reduced. Due to the screen of the protection, rainwater or condensed water cannot enter the interior of the hub so that the sensitive electrical and mechanical installations are protected. Since the protection is freely rotatable, the protection essentially maintains its position with respect to the ground. In other words, the protection is not considerably affected by the rotation of the rotor hub during operation of the wind turbine. In turn, also the screen maintains its position with respect to the ground so that liquid running down the outer surface of the rotor hub can be constantly deflected by the screen. Thus, the ventilation assembly according to the first aspect of the present invention provides a considerably enlarged vent hole while maintaining liquid protection of the hub interior.

According to another aspect of the present invention, a passive ventilator for a wind turbine rotor hub is provided. The passive ventilator includes a frame mountable to the rotor hub, wherein the frame includes at least one opening, and a fan mounted to the frame by a shaft to collar connection, wherein the fan is freely rotatable with respect to the frame.

The passive ventilator according to another aspect of the present invention allows air ventilation by utilizing the rotation of the rotor hub during operation of the wind turbine. Thus, the ventilation does not require any active driving parts, e.g. electrical motors, so that the ventilator is reliable, relatively cheap and almost maintenance-free. Similar to the air vent according to the first aspect of the present invention, the passive ventilator utilizes the hub rotation during operation of the wind turbine. The frame of the ventilator is mounted to the rotor hub and, therefore, will follow the rotational movement of the hub. Since the fan is freely rotatable about its connection to the frame, the fan does not or only very slightly follow the rotational movement of the rotor hub. Thus, the fan executes a relative movement with respect to the rotor hub but essentially maintains its position with respect to the ground.

According to a further aspect of the present invention, a ventilation assembly for a wind turbine rotor blade is provided. The ventilation assembly includes a base plate mountable to the root section of a rotor blade, wherein the base plate includes at least one ventilation hole.

By providing at least one ventilation hole in the base plate inside the blade root, also the interior space of the blades can be used for ventilation purposes, e.g. for dissipating heat via the large surface of the blades.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
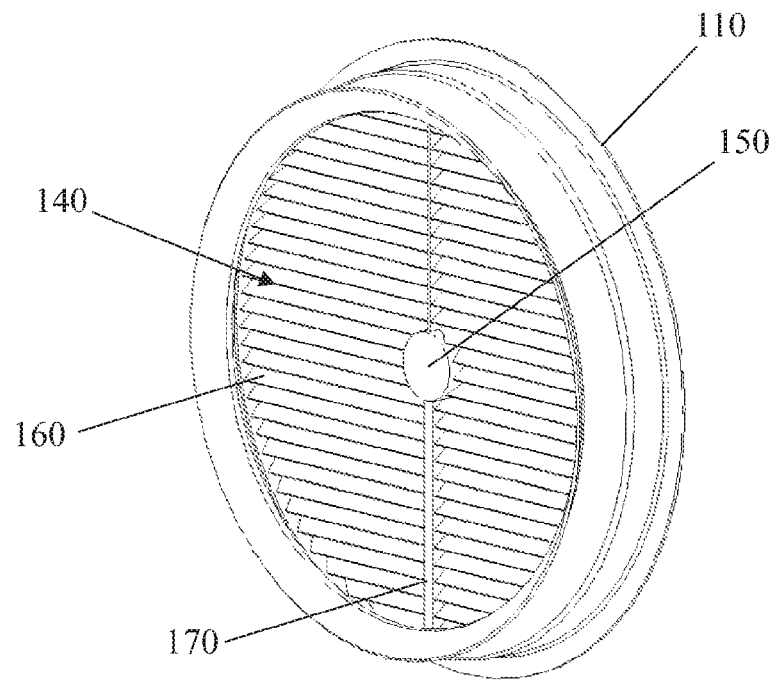
FIG. 1 shows a perspective view of a ventilation assembly according to an embodiment of the present invention.

FIG. 1 shows a perspective view of a ventilation assembly 100 according to an embodiment of the present invention. Therein, the ventilation assembly 100 includes a frame 110 surrounding a cover 140. Frame 110 is adapted to be fixed to a wind turbine rotor hub, e.g. by screws (not shown). Cover 140 is pivoted on a rotational axis 150 to be freely rotatable with respect to the frame 110. Cover 140 includes a shielding member 160 which is formed as a jalousie-like air grill. Since the air grill is pivoted about axis 150, the fins 160 stay in a horizontal position even when the hub rotates during operation of the wind turbine. In other words, frame 110 performs a relative movement with respect to cover 140 when the hub rotates while cover 140 maintains an essentially constant position with respect to the ground due to its inertia. Thus, shielding member 160 prevents water, e.g. rainwater or condensed water, from entering the interior of the hub while simultaneously providing a large area for air exchange between the interior and exterior of the hub. As an optional feature, the embodiment shown in FIG. 1 has an additional weight 170 which is located off-axis of the rotational axis 150 of the cover 140. Thus, the center of mass is shifted towards the outer circumference of the cover 140 so that the position of cover 140 is further stabilized when the hub rotates.

Figure 2:
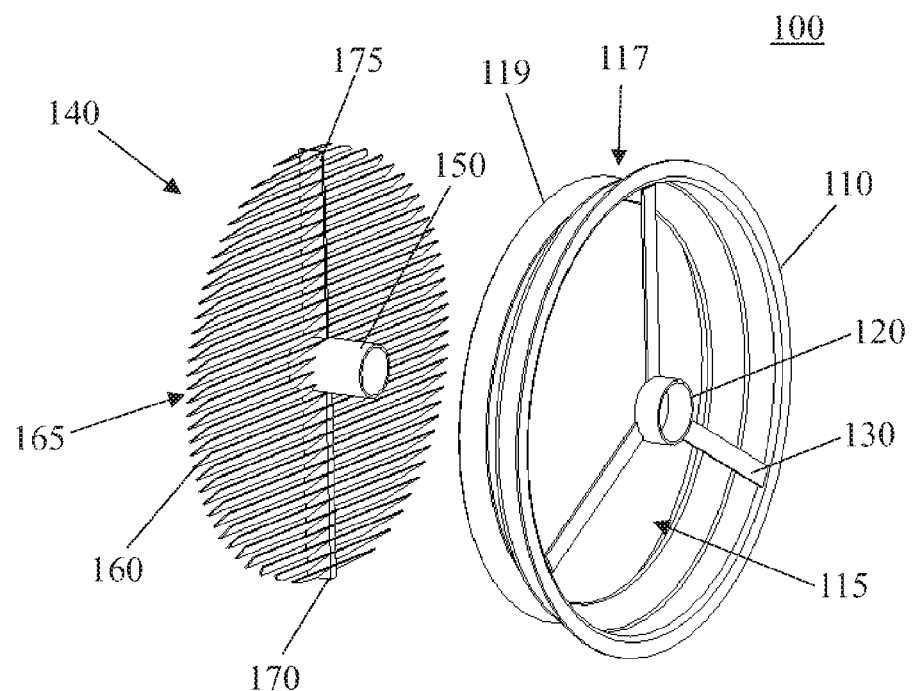
FIG. 2 shows an exploded view of the embodiment shown in FIG. 1.

FIG. 2 shows an exploded view of the embodiment shown in FIG. 1. Therein, it is shown that frame 110 has a central opening 115 through which air can communicated between the exterior and the interior of the rotor hub. Furthermore, frame 110 includes a collar 120 which is held in the center of opening 115 by a support 130. In the present embodiment, support 130 has three support arms but any other suitable type of support or number of support arms may also be applied. As a further optional feature, frame 110 includes a groove 117 surrounding the opening 115. Groove 117 serves for collecting liquid running down the outer surface of the rotor hub. If such liquid arrives at frame 110, it is collected in groove 117 and redirected around opening 115. As an even further optional feature, frame 110 has a screen 119 surrounding opening 115. Screen 119 protrudes radially outward with respect to rotational axis 150 so that it protects opening 115. Although groove 117 and screen 119 are combined in the embodiment shown in FIG. 2, it should be understood that they may also be omitted or provided separately according to other embodiments of the present invention.

The cover 140 has a shaft 150 fitting to collar 120 to form a shaft to collar connection. The shaft 150 is freely rotatable with respect to the collar 120 so that cover 140 is pivoted in a freely rotatable manner. Cover 140 includes a plurality of shielding members 160 which are formed as shrouds 160 attached to vertical supports 170, 175. The shrouds 160 are regularly spaced from each other so that ventilation openings 165 are formed between the shielding members 160 so that air can ingress and egress to the hub through ventilation openings 165 and opening 115 of the frame 110. The shrouds (or fins) 160 extend in a horizontal direction and are inclined with respect to the vertical axis so that the lower end of an upper shroud overlaps with the upper end of a lower shroud. Thus, the whole area of opening 115 is covered by shielding members 160 so that water cannot enter into the hub. Simultaneously, the ventilation openings 165 cover almost the full area of opening 115 so that a considerably large area is provided for air exchange between the interior and exterior of the rotor hub. Thus, hub ventilation and, especially, cooling is considerably improved with respect to the small vent holes of the prior art designs. In particular, the opening area can be increased by two to four orders of magnitude with the ventilation assembly according to the various embodiments of the present invention while still maintaining effective liquid protection.

Figure 3:
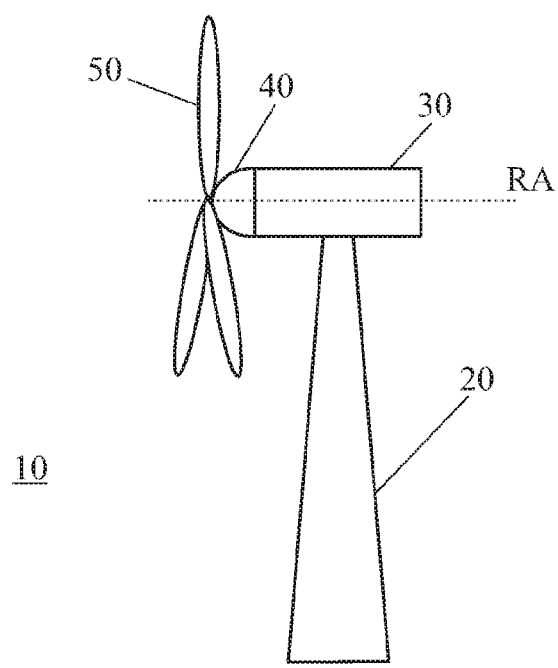
FIG. 3 is a schematic view of a wind turbine.
Figure 4:
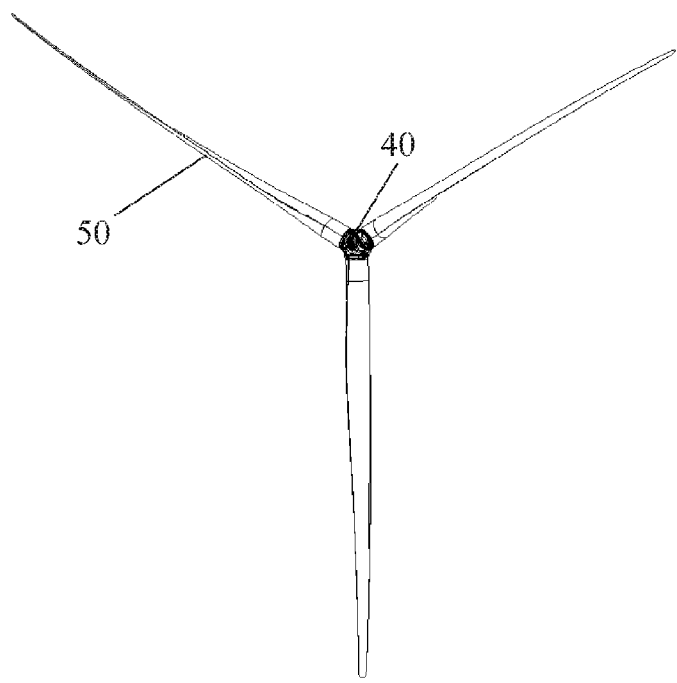
FIG. 4 shows a front view of a wind turbine rotor hub.

FIG. 3 is a schematic view of a wind turbine 10 having a tower 20, a nacelle 30 mounted to the top of tower 20, and a rotor hub 40 mounted to the nacelle 30. Rotor blades 50 are mounted to rotor hub 40 for extracting mechanical power from the wind. During operation, hub 40 rotates with respect to nacelle 30 about rotational axis 30. A front view of wind turbine rotor hub 40 is shown in FIG. 4.

Figure 5:
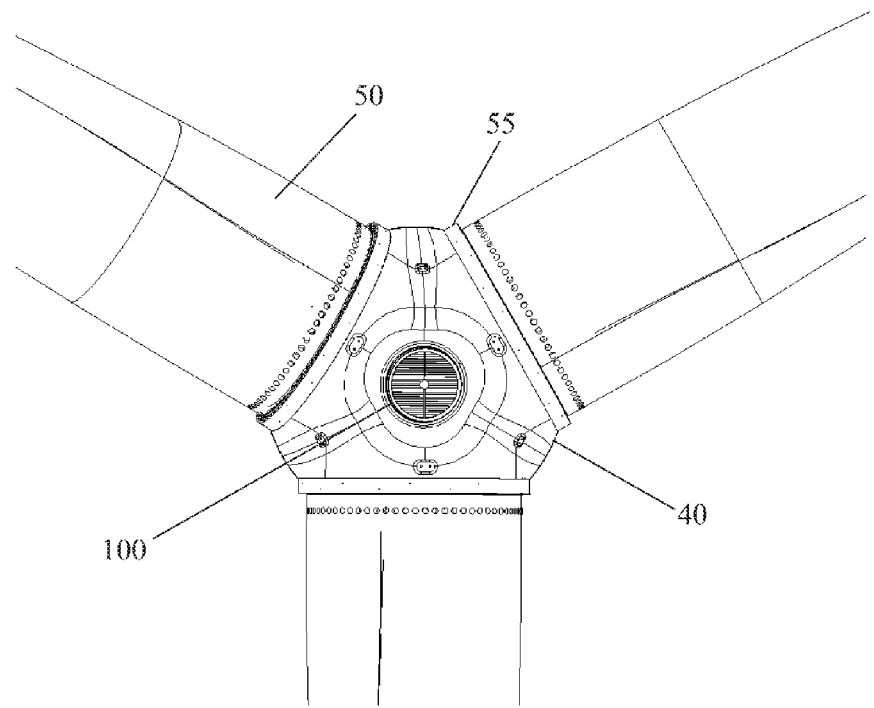
FIG. 5 shows a front view of a wind turbine rotor hub according to an embodiment of the present invention.

FIG. 5 shows a front view of a wind turbine rotor hub 40 according to an embodiment of the present invention. Three rotor blades 50 are mounted to rotor hub 40 at their respective blade root portions 55. A ventilation assembly 100 as it has been described above is provided in the front side of the outer casing of hub 40. The ventilation assembly 10 is centered with respect to rotor hub 40 so that the pivot axis 150 of cover 140 coincides with the rotational axis RA of the rotor hub 40.

Figure 6:
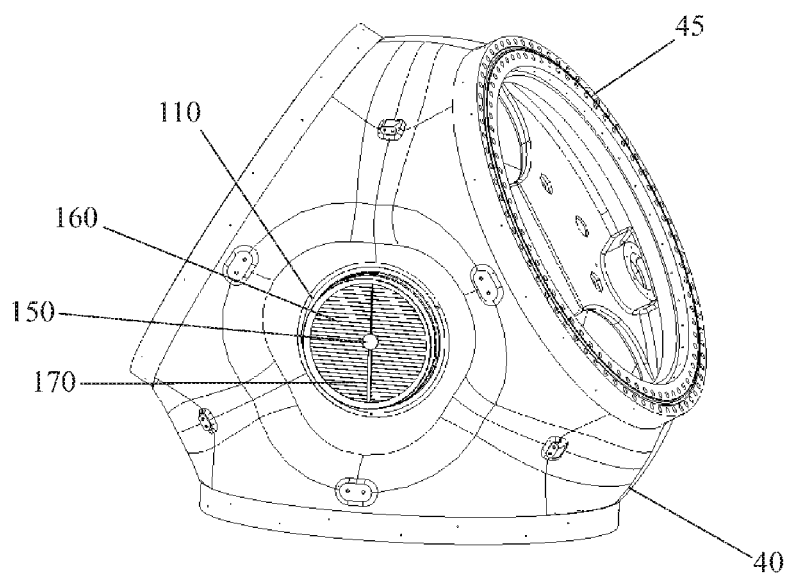
FIG. 6 shows an enlarged perspective view of the rotor hub according to the embodiment shown in FIG. 5.
Figure 7:
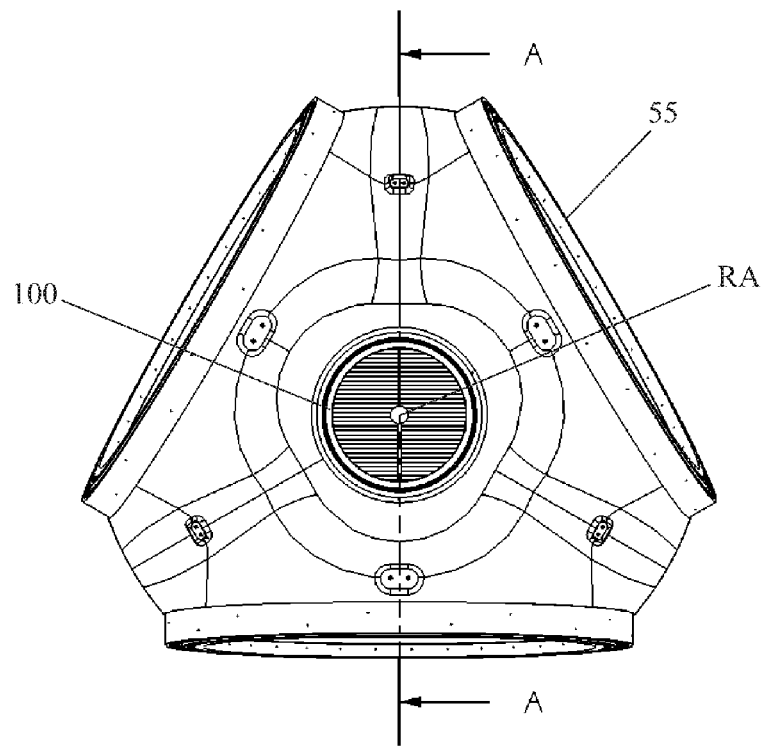
FIG. 7 shows a front view of the embodiment shown in FIG. 6.

FIG. 6 shows an enlarged perspective view of the rotor hub 40 according to the embodiment shown in FIG. 5. Therein, rotor blades 50 have been omitted so that the hub flange 45 to which the blade root 55 is attached by a bolt connection is shown. Furthermore, ventilation assembly 100 is shown in more detail. Frame 110 is fixed to hub 40 so that it will follow the rotational movement of the hub during operation of the wind turbine. Shielding member 160 protects the frame opening 115 (not shown) against rainwater or condensed water running down or splashing against hub 40. Furthermore, shielding member 160 is pivoted in a freely rotatable manner about shaft to collar connection 150. Shaft 150 is aligned with the rotational axis RA of the hub 40 so that no centrifugal forces are acting on the cover. Furthermore, an off-axis weight 170 stabilizes the horizontal position of the fins. A front view of this embodiment is shown in FIG. 7. It should be understood that the present invention can also be realized with embodiments in which shaft 150 does not coincide with the rotational axis RA of the hub but is radially spaced from the rotational axis. In such embodiments, however, centrifugal forces are acting on the shaft to collar connection 120, 150 and may deteriorate the horizontal stability of the air grill during rotation of the hub.

Figure 8:
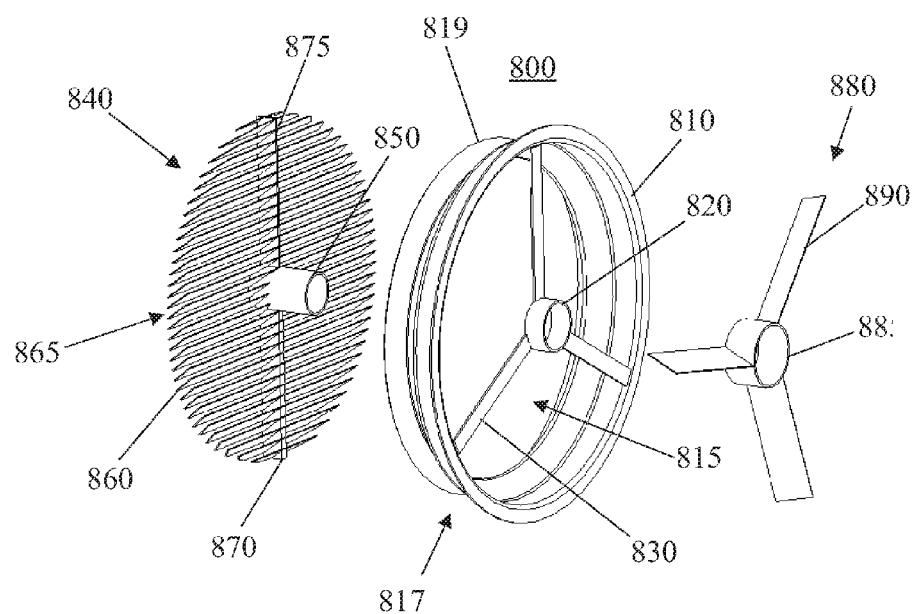
FIG. 8 shows an exploded view of a ventilation assembly according to another embodiment of the present invention.

FIG. 8 shows an exploded view of a ventilation assembly 800 according to another embodiment of the present invention. The basic configuration of ventilation assembly 800 is similar to the embodiment shown in FIG. 1. The ventilation assembly 800 includes a frame 810 having an opening 815 and a collar 820 held by supports 830. Furthermore, a freely rotatable cover 840 with a central shaft 850 and shielding members 860 is provided. Like the cover 140 of the embodiment shown in FIG. 1, cover 840 includes vertical supports 870, 875 to which the horizontal fins of the air grill are attached. The vertical support 870 below shaft 850 is formed as an additional off-axis weight for stabilizing the horizontal orientation of the fins when the rotor hub is rotating. Additionally, a fan 880 is provided in the ventilation assembly. The fan 880 has a central collar 885 to which blades 890 are attached. Like cover 840, also fan 880 is pivoted to be freely rotatable with respect to frame 810. Therefore, fan 880 executes a relative movement with respect to frame 810 when frame 810 follows the rotational movement of the rotor hub 40 to which is fixed. Thus, fan 880 forms a passive ventilator which does not require any active driving parts like an electric motor or the like. Instead, the passive ventilator 880 utilizes the rotation of the rotor hub 40 during operation of the wind turbine. The ventilation efficiency of the ventilation assembly 800 is thus improved by providing passive ventilator 880.

Figure 9:
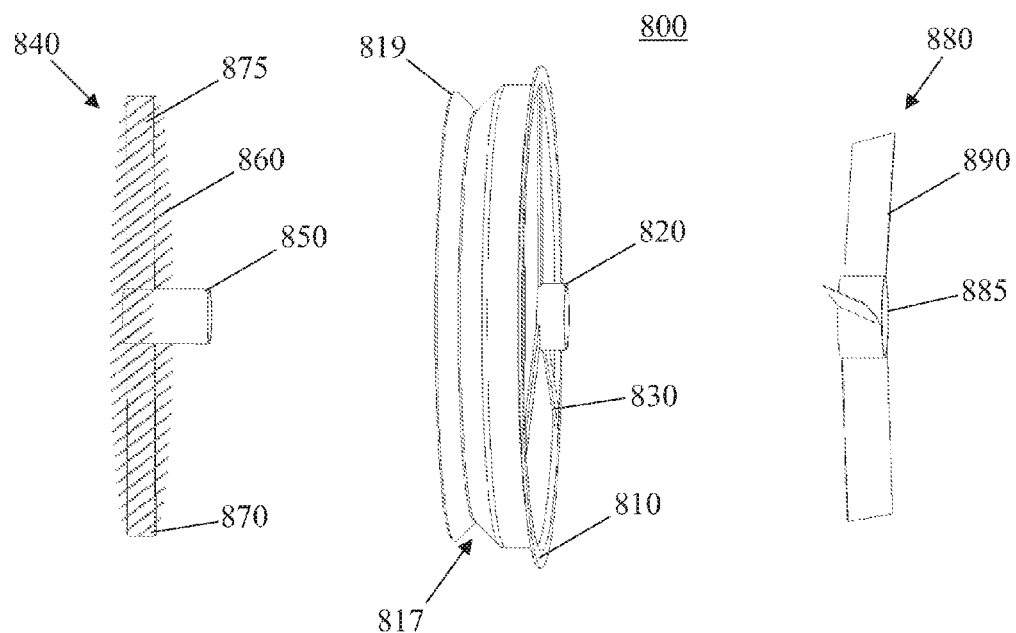
FIG. 9 shows a side view of the embodiment shown in FIG. 8.

FIG. 9 shows a side view of the ventilation assembly 800 shown in FIG. 8. Also frame 810 of the ventilation assembly 800 according to the present embodiment has a groove 817 and a shield 819, both surrounding opening 815 to improve liquid protection. It can also bee seen that the cover 840 and the fan 880 are coaxially aligned, i.e. their respective rotational axes coincide. According to the embodiment shown in FIG. 9, the shaft 850 of cover 840 extends through the collar 820 of the frame 810 so that collar 885 of fan 880 can form a shaft to collar connection with shaft 850. According to an alternative embodiment, fan 880 may have a shaft that extends through collar 820 of frame 810 and cover 840 may have a collar to mount cover 840 to the shaft of the fan 880. In any of these embodiments, the fan 880 or cover 840 having a collar may be either fixed to the shaft extending through collar 820 or may be pivoted in a freely rotatable manner on the shaft extending through collar 820. According to another alternative embodiment, both cover 840 and fan 880 may have collars and frame 810 may have shafts extending toward both the cover 840 and the fan 880. According to still a further alternative embodiment, both cover 840 and fan 880 may have shafts of different diameters fitting into each other.

Figure 10:
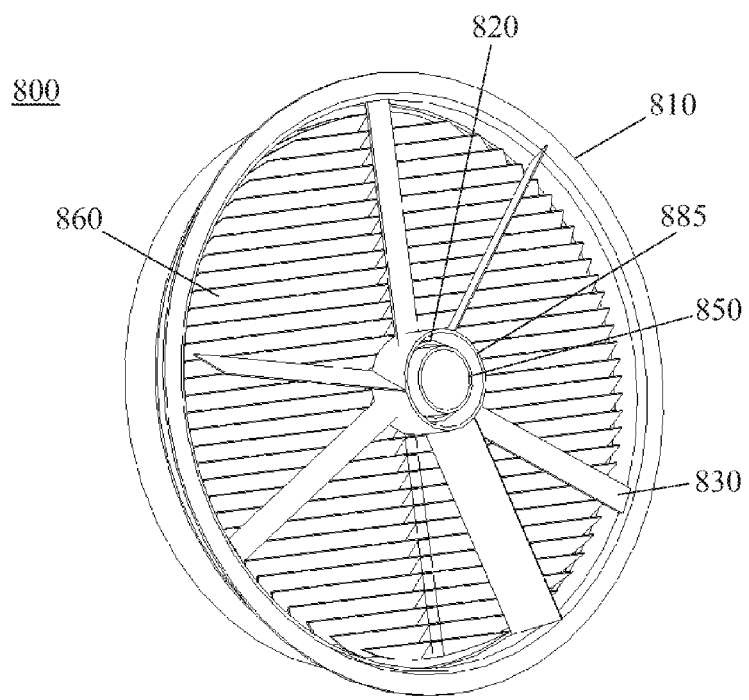
FIG. 10 shows a perspective view of the embodiment shown in FIG. 8.

FIG. 10 shows a perspective view of an assembled state of the ventilation assembly 800 according to the embodiment shown in FIG. 8. Therein, it is shown how the collars 820, 885 of the frame 810 and fan 880, respectively, are coaxially aligned with the shaft 850 of the cover 840.

Figure 11:
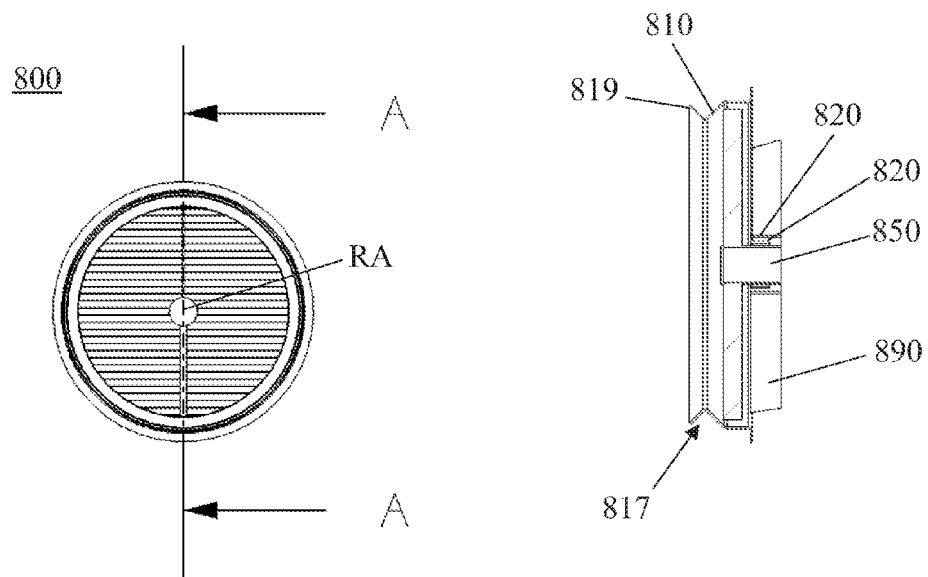
FIG. 11 shows a cross-sectional view of the embodiment shown in FIG. 8.

The same embodiment is shown in FIG. 11. The right-hand side of FIG. 11 shows a cross-sectional view along line A-A as indicated on the left-hand side. The cross-section extends through the rotational axis RA. In the cross-sectional view, the coaxial orientation of frame 810, cover 840 and fan 880 is shown.

Figure 12:
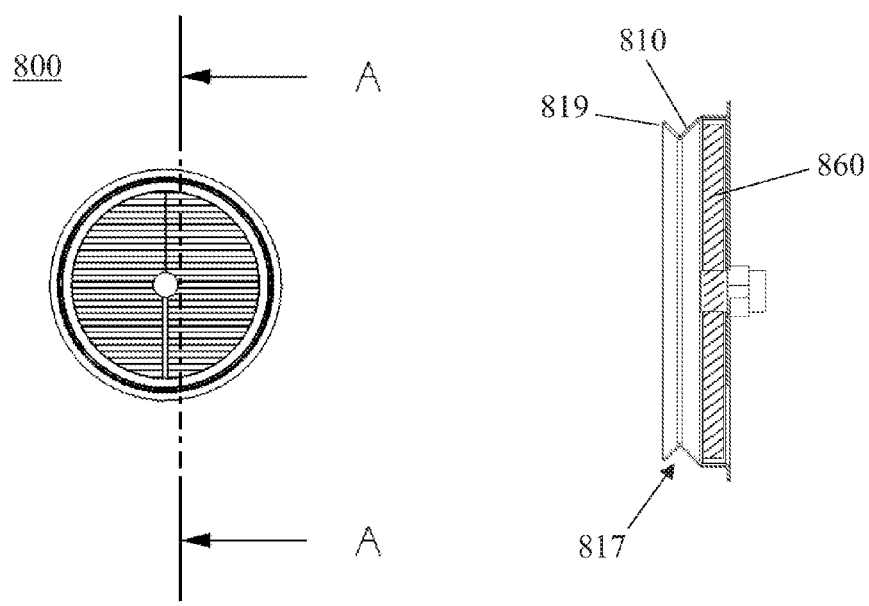
FIG. 12 shows a further cross-sectional view of the embodiment shown in FIG. 8.

FIG. 12 shows a further cross-sectional view of this embodiment taken along line A-A as indicated on the left-hand side of FIG. 12, i.e. off-center. Therein, the vertical inclination and the overlapping of the fins 760 is apparent from the right-hand side.

Figure 13:
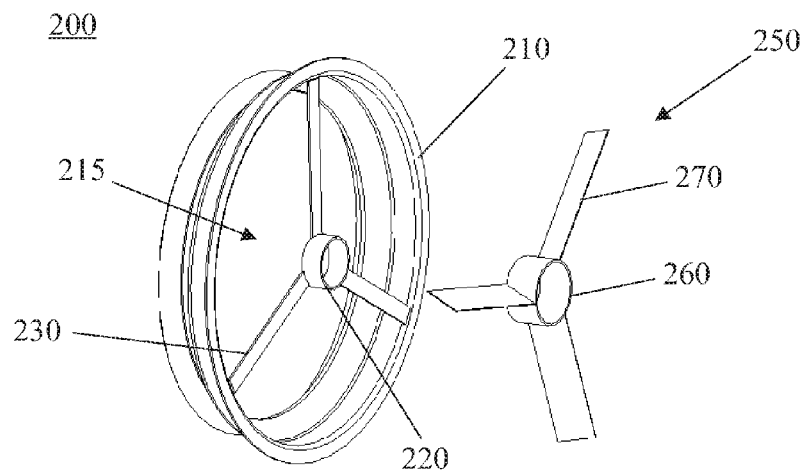
FIG. 13 shows a passive ventilator for a wind turbine rotor hub according to an embodiment of the present invention.

FIG. 13 shows a passive ventilator 200 for a wind turbine rotor hub according to an embodiment of the present invention. The passive ventilator 200 includes a frame 210 which can be mounted to the rotor hub of the wind turbine, e.g. by screws, bolts or the like. The frame 210 has at least one opening 215 and a shaft 220 held by supports 230. Thus, frame 210 of the ventilator differs from frames 110, 810 of the ventilation assemblies described above in that it has a shaft instead of a collar. Furthermore, a fan 250 is provided, wherein the fan 250 has a collar 260 and at least one blade 270. Fan 250 can be mounted to the frame 210 by a shaft to collar connection 220, 260 so that the fan 250 is pivoted in a freely rotatable manner with respect to the frame 210. Therefore, fan 250 executes a relative movement with respect to frame 210 when frame 210 follows the rotational movement of the rotor hub 40 to which is fixed. Thus, fan 250 forms a passive ventilator which does not require any active driving parts like an electric motor or the like. Instead, the passive ventilator 200 utilizes the rotation of the rotor hub 40 during operation of the wind turbine. Since the ventilator does not require any active driving parts, e.g. electrical motors, the ventilator is reliable, relatively cheap and almost maintenance-free.

Figure 14:
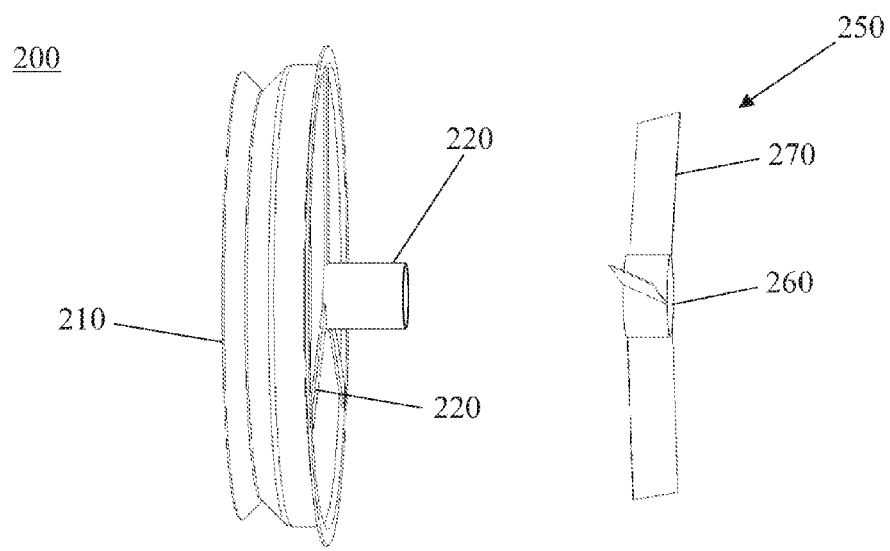
FIG. 14 shows a side view of the embodiment shown in FIG. 13.

FIG. 14 shows a side view of the passive ventilator 200 according to the embodiment shown in FIG. 13. Therein, it is shown that collar 260 of fan 250 is slideably mounted onto shaft 220 of frame 210. According to an alternative embodiment, frame 210 is provided with a collar and fan 250 is provided with a shaft. However, in both embodiments the shaft to collar connection allows free rotation of the fan with respect to the frame.

According to a further embodiment of the passive ventilator, the center of mass of the fan 250 is located at a radial distance from the axis of rotation of the fan 220. This may be achieved, e.g., by using blades 270 of different weight or by attaching an additional weight to at least one of the blades 270. By providing an asymmetric weight distribution to the fan 250, the orientation of fan 250 with respect to the rotating frame 210 is stabilized in the same manner as described above with respect to cover 140.

Figure 15:
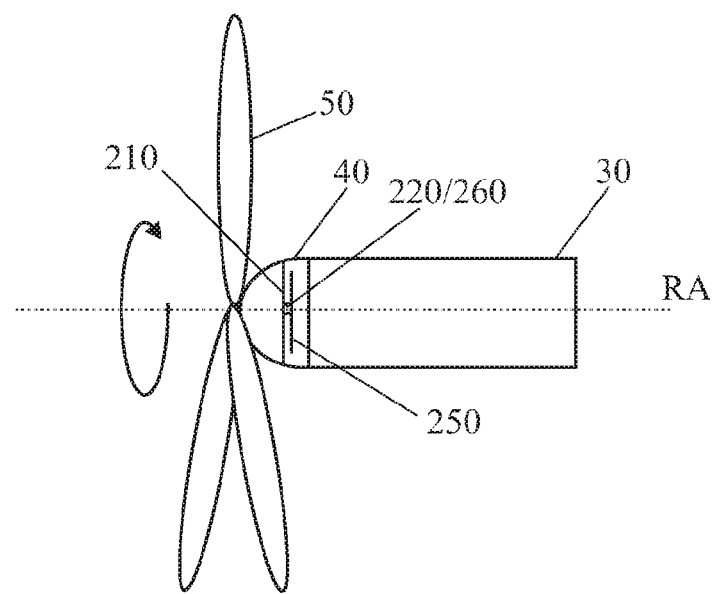
FIG. 15 is a schematic side view of a wind turbine according to an embodiment of the present invention.

FIG. 15 is a schematic side view of a wind turbine according to an embodiment of the present invention. Therein, a frame 210 is mounted inside the rotor hub 40 and a fan 250 is pivoted in a freely rotatable manner to the frame 210 by means of a shaft to collar connection 220, 260. The ventilator is coaxially aligned with the rotational axis RA of the wind turbine. In operation, rotor blades 50 extract mechanical power from the wind and initiate rotation of the hub 40 with respect to nacelle 30. Since frame 210 is fixed to hub 40, frame 210 follows the rotational movement of the hub, i.e. frame 210 also rotates. However, fan 250 is pivoted in a freely rotatable manner so that it does not follow the rotation of hub 40 but remains in its initial position due to its inertia. Therefore, fan 250 moves relative to the interior of hub 40 and, thus, provides ventilation inside hub 40.

Figure 16:
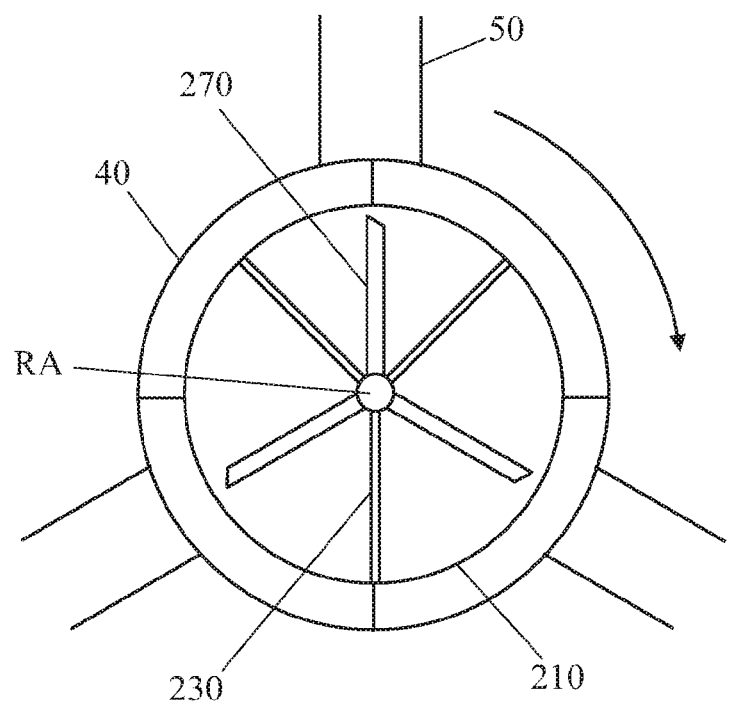
FIG. 16 shows a front view of the embodiment shown in FIG. 15.

FIG. 16 shows a front view of the embodiment according to the present invention shown in FIG. 15. Therein, hub 40 rotates in a clockwise direction. Frame 210 is fixed to hub 40 and, therefore, also rotates in the clockwise direction. Also, the supports 230 and shaft 220 of the passive ventilator 200 rotate together with frame 210. The fan 250, in particular blades 270, maintains its initial position with respect to rotational axis RA and, thus, performs a relative movement with respect to the interior of hub 40.

Figure 17:
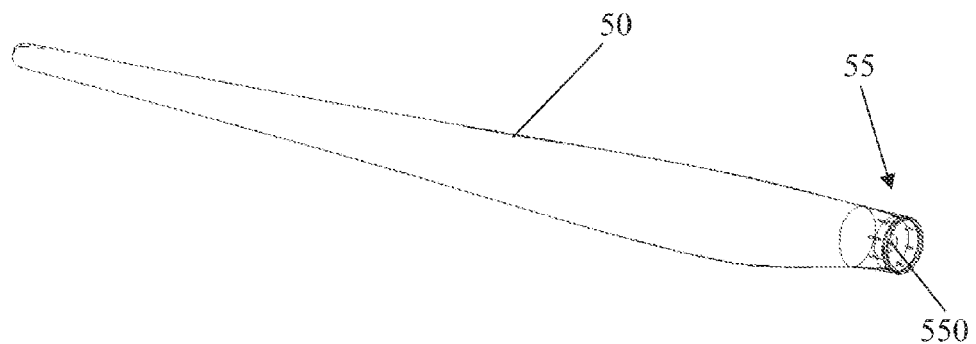
FIG. 17 shows a rotor blade ventilation according to an embodiment of the present invention.

FIG. 17 shows a rotor blade ventilation according to an embodiment of the present invention. Therein, a rotor blade 50 is provided with a conventional blade pedestal which is typically formed as a wooden plate. The blade pedestal is provided in the root portion 55 of blade 50. According to the embodiment of the present invention, there is a ventilation 550 provided in the blade pedestal so that the interior of the blade 50 and the interior of the hub 40 are in fluid communication. Typically, the ventilation 550 may include a conventional labyrinth seal (not shown) to avoid water intrusion into the blade during standstill of the wind turbine.

Figure 18:
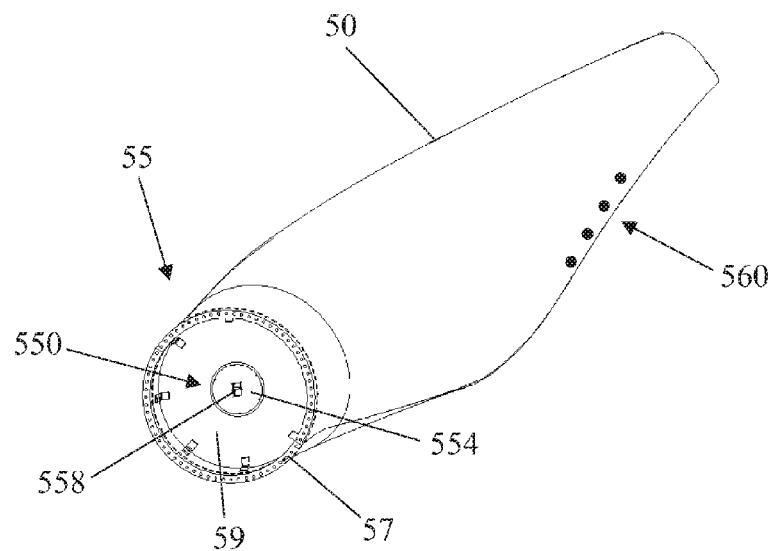
FIG. 18 shows an enlarged view of an improved version of the embodiment shown in FIG. 17.

FIG. 18 shows an enlarged view of an improved version of the embodiment shown in FIG. 17. Therein, the ventilation 550 in base plate 59 includes a ventilation plate 554 having at least one vent hole 558 sealed with a labyrinth seal. Furthermore, vent holes 560 are provided at the trailing edge of the blade 50. Thus, air intake from the interior of hub 40 may occur through vent hole 558. The air intake may be enhanced by passive or actively driven ventilators provided inside hub 40. According to one embodiment, an electrically driven ventilator is mounted in front of vent hole 558. The intake air is then exhausted from the interior of blade 50 through ventilation openings 560. Thus, effective ventilation and cooling of the interior of rotor hub 40 is provided.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A ventilation assembly for a wind turbine rotor hub, comprising:
   a frame fixedly mountable to the wind turbine rotor hub, the frame including at least one opening; and
   a cover for the at least one opening, the cover mounted to the frame to be freely rotatable with respect to the frame, wherein the cover has at least one ventilation opening to allow the ingress and egress of air and has a shielding member for shielding the at least one ventilation opening against ingress of liquid running down the wind turbine rotor hub.

2. The ventilation assembly according to claim 1, wherein the shielding member is formed as a jalousie.

3. The ventilation assembly according to claim 1, wherein the shielding member comprises at least one shroud.

4. The ventilation assembly according to claim 1, wherein the cover further comprises a weight located off-axis of a rotational axis of the cover.

5. The ventilation assembly according to claim 1, wherein the frame and the cover are mounted to each other by a shaft-to-collar connection, wherein the shaft is freely rotatable with respect to the collar.

6. The ventilation assembly according to claim 1, wherein the frame comprises a groove surrounding the cover.

7. The ventilation assembly according to claim 1, wherein the frame comprises a screen surrounding the cover.

8. The ventilation assembly according to claim 1, further comprising a fan mounted to the frame to be freely rotatable with respect to the frame.

9. The ventilation assembly according to claim 8, wherein the fan is mounted to a shaft of the cover.

10. The ventilation assembly according to claim 8, wherein the cover is mounted to a shaft of the fan.

11. The ventilation assembly according to claim 1, wherein an axis of rotation of the cover is aligned with an axis of rotation of the wind turbine rotor hub.

12. The ventilation assembly according to claim 1, wherein the frame is mounted to a front side of the wind turbine rotor hub.

13. A passive ventilator for a wind turbine rotor hub, comprising:
   a frame mountable to the wind turbine rotor hub, frame including at least one opening; and
   a fan mounted to the frame by a shaft-to-collar connection, a rotational axis of the fan substantially axially aligned with a rotational axis of the wind turbine rotor hub, and the fan freely rotatable with respect to the frame.

14. The passive ventilator according to claim 13, wherein the shaft is freely rotatable with respect to the collar.

15. The passive ventilator according to claim 13, wherein a center of mass of the fan is located at a radial distance from an axis of rotation of the fan.

16. The passive ventilator according to claim 13, wherein the frame is mounted inside the wind turbine rotor hub.

17. The passive ventilator according to claim 13, further comprising a cover for the at least one opening, the cover mounted to the frame to be freely rotatable with respect to the frame, wherein the cover has at least one ventilation opening to allow ingress and egress of air and has a shielding member for shielding the at least one ventilation opening against ingress of liquid running down the wind turbine rotor hub.

18. The passive ventilator in accordance with claim 17, wherein the cover further comprises a weight located off-axis of a rotational axis of the cover, the weight configured to substantially maintain a horizontal stability of the cover during rotation of the wind turbine rotor hub.

19. The passive ventilator in accordance with claim 17, wherein the cover is configured to substantially prevent ingress of water during wind turbine rotor hub operation.

* * * * *